(12) United States Patent  (10) Patent No.: US 9,112,561 B2
Mazzarese et al.  (45) Date of Patent: *Aug. 18, 2015

(54) METHOD AND SYSTEM FOR PRECODING DATA

(71) Applicant: Huawei Technologies Co., Ltd., Shenzhen (CN)

(72) Inventors: David Mazzarese, Beijing (CN); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/547,883

(22) Filed: Nov. 19, 2014

(65) Prior Publication Data

US 2015/0078474 A1  Mar. 19, 2015

Related U.S. Application Data

(63) Continuation of application No. 14/157,597, filed on Jan. 17, 2014, now Pat. No. 8,908,791, which is a continuation of application No. 13/603,441, filed on Sep. 5, 2012, now Pat. No. 8,665,984, which is a continuation of application No. PCT/CN2010/076383, filed on Aug. 26, 2010.

(51) Int. Cl.
*H04B 7/02* (2006.01)
*H04B 7/04* (2006.01)
(Continued)

(52) U.S. Cl.
CPC ............ *H04B 7/0486* (2013.01); *H04B 7/0417* (2013.01); *H04B 7/063* (2013.01);
(Continued)

(58) Field of Classification Search
CPC ..... H04L 1/0618; H04L 1/06; H04L 25/0204; H04B 7/0417; H04B 7/0669
USPC .......... 375/267, 260, 259, 316, 295; 370/203, 370/210, 208
See application file for complete search history.

(56) References Cited

U.S. PATENT DOCUMENTS

| 2010/0284351 A1 | 11/2010 | Liang et al. | |
| 2011/0194632 A1* | 8/2011 | Clerckx et al. | 375/260 |
| 2012/0076236 A1* | 3/2012 | Ko et al. | 375/296 |

FOREIGN PATENT DOCUMENTS

| CN | 101330479 A | 12/2008 |
| CN | 101388699 A | 3/2009 |

(Continued)

OTHER PUBLICATIONS

Roh et al., "Efficient methods of Reporting CQIs in MIMO System," pp. 1-22 (Feb. 5, 2007).

(Continued)

*Primary Examiner* — Zewdu Kassa
(74) *Attorney, Agent, or Firm* — Leydig, Voit & Mayer, Ltd.

(57) ABSTRACT

The present disclosure relates to channel state feedback in a communication system. The method includes obtaining a reference signal from an access point; deriving a rank indication, a codebook subset selection indication and a precoding matrix index based on the obtained reference signal; sending a first feedback message conveying the rank indication and the codebook subset selection indication, and sending a second feedback message conveying the precoding matrix index, to the access point; and receiving, from the access point, data precoded by a matrix derived based on the rank indication, the codebook subset selection indication and the precoding matrix index.

16 Claims, 7 Drawing Sheets

(51) Int. Cl.
H04B 7/06 (2006.01)
H04L 1/00 (2006.01)
H04L 5/00 (2006.01)
H04L 25/03 (2006.01)

(52) U.S. Cl.
CPC .......... H04B 7/0632 (2013.01); H04B 7/0639 (2013.01); H04L 5/006 (2013.01); H04L 5/0057 (2013.01); H04L 1/0026 (2013.01); H04L 1/0028 (2013.01); H04L 5/0023 (2013.01); H04L 5/0037 (2013.01); H04L 5/0048 (2013.01); H04L 25/03923 (2013.01); H04L 25/03949 (2013.01)

(56) References Cited

FOREIGN PATENT DOCUMENTS

| CN | 101615979 A | 12/2009 |
|---|---|---|
| WO | WO 2008022243 A2 | 2/2008 |
| WO | WO 2009023532 A2 | 2/2009 |
| WO | WO 2009096708 A1 | 8/2009 |

OTHER PUBLICATIONS

"Extensions to Rel-8 type CQI/PMI/RI feedback using double codebook structure," 3GPP TSG RAN WG1#59bis, Valencia, Spain, R1-100251, 3$^{rd}$ Generation Partnership Project, Valbonne, France (Jan. 18-22, 2010).
"Double codebook based differential feedback for MU-MIMO enhancement," 3GPP TSG RAN WG1#61bis, Dresden, Germany, R1-103449, 3$^{rd}$ Generation Partnership Project, Valbonne, France (Jun. 28-Jul. 2, 2010).
"Double codebook performance evaluation," 3GPP TSG RAN WG1#61bis, Dresden, Germany, R1-103805, 3$^{rd}$ Generation Partnership Project, Valbonne, France (Jun. 28-Jul. 2, 2010).
"A feedback framework based on W2W1 for Rel. 10," 3GPP TSG RAN WG1#61bis, Dresden, Germany, R1-103664, 3$^{rd}$ Generation Partnership Project, Valbonne, France (Jun. 28-Jul. 2, 2010).
"3$^{rd}$ Generation Partnership Project; Technical Specification Group Radio Access Network; Evolved Universal Terrestrial Radio Access (E-UTRA); Multiplexing and channel coding (Release 9)," 3GPP TS 36.212, Version 9.2.0, 3$^{rd}$ Generation Partnership Project, Valbonne, France (Jun. 2010).
"3$^{rd}$ Generation Partnership Project; Technical Specification Group Radio Access Network; Evolved Universal Terrestrial Radio Access (E-UTRA); Physical layer procedures (Release 9)," 3GPP TS 36.213, Version 9.2.0, 3$^{rd}$ Generation Partnership Project, Valbonne, France (Jun. 2010).
"Refinements of Feedback and Codebook Design," 3GPP TSG RAN WG1#61, Montreal, Canada, R1-102630, 3$^{rd}$ Generation Partnership Project, Valbonne, France (May 10-14, 2010).
"DL codebook for 8 TX," 3GPP TSG RAN WG1#61, Montreal, Canada, R1-103105, 3$^{rd}$ Generation Partnership Project, Valbonne, France (May 10-14, 2010).
"3$^{rd}$ Generation Partnership Project; Technical Specification Group Radio Access Network; Evolved Universal Terrestrial Radio Access (E-UTRA); Physical Channels and Modulation (Release 9)," 3GPP TS 36.211, Version 9.1.0, pp. 1-85, 3$^{rd}$ Generation Partnership Project, Valbonne, France (Mar. 2010).

* cited by examiner

METHOD AND SYSTEM FOR PRECODING DATA

CROSS-REFERENCE TO RELATED APPLICATION

This application is a continuation of U.S. patent application Ser. No. 14/157,597, filed on Jan. 17, 2014, which is a continuation of U.S. patent application Ser. No. 13/603,441, filed on Sep. 5, 2012. U.S. patent application Ser. No. 13/603,441 is a continuation of International Patent Application No. PCT/CN2010/076383, filed on Aug. 26, 2010. The aforementioned patent applications are hereby incorporated by reference in their entireties.

TECHNICAL FIELD

The present invention relates to communication technologies, and in particular, to a method and system for precoding data.

BACKGROUND

In Multiple Input Multiple Output (MIMO) Orthogonal Frequency Division Multiplexing Access (OFDMA) cellular systems, closed-loop MIMO precoding is defined to enable high throughput downlink transmissions to fixed and nomadic user terminals. Feedback information is obtained by a transmitting device via a report of a precoding matrix index (PMI) from a receiving device. This PMI is used to represent a matrix in a codebook (a codebook is a set of matrices), and the PMI is used by the transmitting device to derive a downlink precoder. While the concepts of "transmitting device" and "receiving device" are relevant to each other, in the scenarios involved in this application, the transmitting device may be in a form of a network entity, such as a base station, an evolved NodeB (eNB) or an access point. The receiving device may be in a form of a user equipment (UE), such as a mobile device, a cellular telephone, a wireless enabled personal digital assistant (PDA), a wireless enabled laptop computer, or other such devices. However, it is noted that the present application is not limited by these scenarios.

Simple codebook structures are used in the first generation of MIMO OFDMA systems, such that the PMI can be represented in a few bits. Small codebooks can be used to achieve a coarse quantization of a spatial channel. For example, a 4-bit codebook is defined and a 4-bit PMI can be reported via a capacity-limited feedback channel called Physical uplink control channel (PUCCH). Precoding matrices are defined for each possible transmission rank, where the transmission rank determines the size of the precoding matrix. The overall codebook is a set of matrices for each rank. The feedback report thus includes a rank indication (RI) and a PMI in the codebook subset of the given rank. Since the rank of the propagation channel varies slowly in comparison with fast fading over which the PMI is adapted, the rank indication is reported with a longer period than the PMI.

Since the RI remains valid during several reports of the PMI, it can be encoded with a better error protection code in order to ensure that consecutive PMI reports are not invalidated by one erroneous RI report. In general, this is naturally ensured by the fact that the rank can take values in a limited range, such as {1, 2, 3, 4} in LTE (Long Term Evolution) system Rel-8, due to the limitation to a maximum of 4 antennas at the transmitting device and 4 antennas at the receiving device. Thus the RI can be represented by 2 bits. Since the PMI is in general reported along with a channel quality indication (CQI) that represents the channel quality, assuming that the transmitting device precodes data with the reported PMI, the total size of the feedback message that contains the PMI+CQI is larger than the 4 bits used to represent just the PMI. For example, in LTE Rel-8, the message size will be 8 to 11 bits with one to two CQIs, respectively. The PUCCH is transmitted in a fixed-size time-frequency resource with a fixed modulation. The 2 bits of RI that are reported individually are better protected than the 8 or 11 bits of PMI and CQI that are jointly reported, since the 2 bits of RI enjoy a lower error-correction encoding rate.

SUMMARY

According to a first aspect of the present invention, a method for precoding data in a wireless communication system is provided. The method includes the following:
  receiving, by a receiving device, a reference signal from a transmitting device;
  deriving, by the receiving device, a rank indication, a codebook index n1 in a first codebook C1, codebook indices k1 and k2 in a second codebook C2, a wideband channel quality indicator CQI1 and a subband channel quality indicator CQI2, based on the received reference signal;
  sending, by the receiving device, the rank indication, the codebook index n1 in the first codebook C1, the codebook indices k1 and k2 in the second codebook C2, the wideband channel quality indicator CQI1 and the subband channel quality indicator CQI2, to the transmitting device; and
  receiving, by the receiving device, data precoded by a first precoder from the transmitting device. The first precoder is determined by the transmitting device based on the rank indication and the indices n1, k1 and k2.

According to a second aspect of the invention, a receiving device is provided. The receiving device includes the following:
  a receiver, configured to receive a reference signal from a transmitting device;
  a processor, configured to derive a rank indication, a codebook index n1 in a first codebook C1 and codebook indices k1 and k2 in a second codebook C2, a wideband channel quality indicator CQI1 and a subband channel quality indicator CQI2 based on the reference signal; and
  a transmitter, configured to send the rank indication, the codebook index n1 in the first codebook C1, the codebook indices k1 and k2 in the second codebook C2, the wideband channel quality indicator CQI1 and the subband channel quality indicator CQI2 to the transmitting device.

Further, the receiver is configured to receive, from the transmitting device, data precoded by a first precoder. The first precoder is determined by the transmitting device based on the rank indication and the indices n1, k1 and k2.

The above receiving device may be a user equipment (UE) such as a mobile device, a cellular telephone, a wireless enabled personal digital assistant (PDA), or a wireless enabled laptop computer.

According to a third aspect of the invention, another method for precoding data in a wireless communication system is provided. The method includes the following:
  receiving, by a transmitting device, a rank indication, a codebook index n1 in a first codebook C1, codebook indices k1 and k2 in a second codebook C2, a wideband channel quality indicator CQI1 and a subband channel quality indicator CQI2 from a receiving device;

determining, by the transmitting device, a first precoder based on the rank indication and the indices n1, k1 and k2;

precoding, by the transmitting device, data to be sent to the receiving device using the first precoder; and sending, by the transmitting device, the precoded data to the receiving device.

According to a fourth aspect of the invention, a transmitting device is provided. The transmitting device includes the following:

a receiver, configured to receive a rank indication, a codebook index n1 in a first codebook C1, codebook indices k1 and k2 in a second codebook C2, a wideband channel quality indicator CQI1 and a subband channel quality indicator CQI2 from a receiving device; a processor, configured to determine a first precoder based on the rank indication and the indices n1, k1 and k2, and precode data to be sent to the receiving device using the first precoder; and a transmitter, configured to send the precoded data to the receiving device.

The above transmitting device may be a network entity such as base station, an evolved Node B or an access point.

According a fifth aspect of the invention, a system for precoding data is provided. The system includes a transmitting device and a receiving device as detailed above.

DETAILED DESCRIPTION

Figure 1:
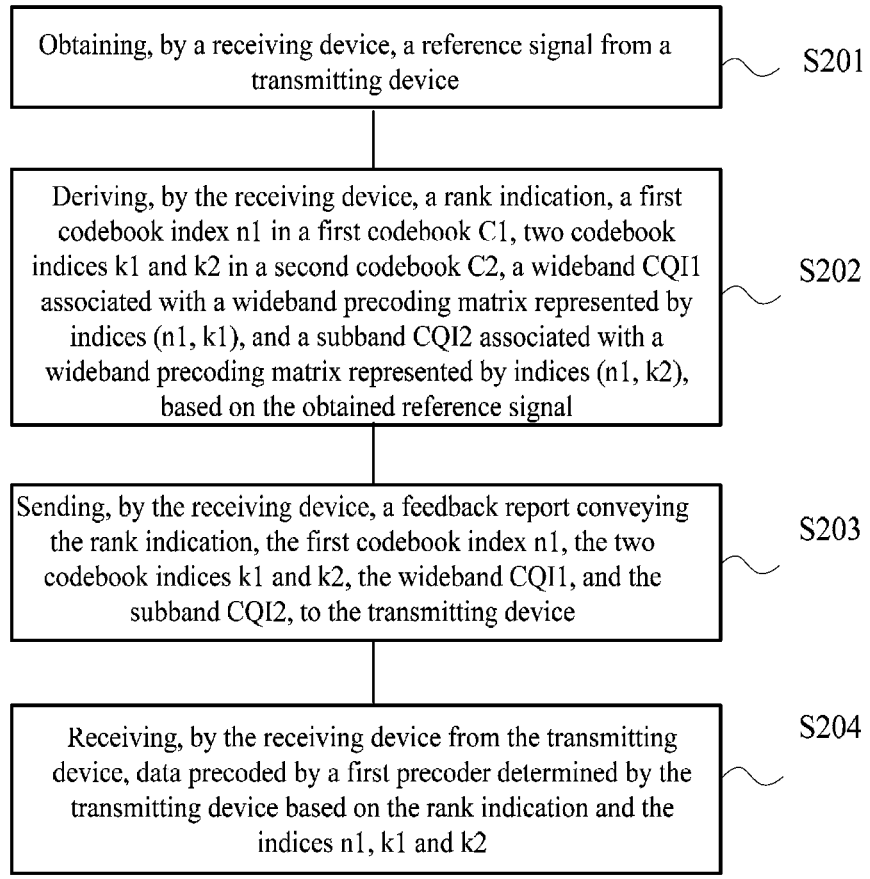
FIG. 1 is a flowchart of a method for precoding data according to an embodiment of the present invention.

Particularly, embodiments of the present invention relate to reporting multiple quantized representation of channel state information of a propagation channel in a capacity-limited feedback channel using a double codebook structure. A wireless communication system comprises at least one transmitting device and at least one receiving device. The transmitting device may be in a form of a network entity, such as a base station, an evolved NodeB (eNB) or an access point. The receiving device may be in a form of a user equipment (UE), such as a mobile device, a cellular telephone, a wireless enabled personal digital assistant (PDA) a wireless enabled laptop computer, or other such devices. At least one reference signal to the receiving device and a feedback channel from the receiving device allow the transmission from the transmitting device using codebook-based precoding when the transmitting device is equipped with multiple transmit antennas.

For high-throughput operation in MIMO OFDMA systems, such as the LTE system, IEEE 802.16e/m system or other such systems, a receiving device may be asked to feedback one PMI for each subband of the bandwidth of the system, since it offers a better granularity than a wideband precoder and allows the transmitting device to adapt its precoder to the frequency-selectivity of the wireless propagation channel, as well as providing information for multiuser diversity scheduling. In order to take advantage of these properties while limiting the rate of feedback in the channel to an acceptable level, a receiving device may be asked to report the PMIs for a set of selected subbands that do not span the entire bandwidth of operation. Additionally, in order to ensure a smooth operation of the scheduler at the transmitting device, it is often also required that the receiving device reports a wideband PMI along with the subband PMIs of selected subbands, so that the transmitting device has channel state information for scheduling that receiving device in any of the subbands for which a subband PMI is not reported. As pointed out above, a CQI is reported in association with a PMI, so a wideband CQI is reported along the wideband PMI, while a subband CQI is reported for each of the subband PMIs.

Enhancements of the feedback for closed-loop precoding beyond the simple 4-bit codebook or antenna array sizes for larger transmission would require more complex codebook structures, as well as a larger codebook size. A first type of enhanced codebook contains matrices that provide a quantization of the MIMO propagation channel between an array of transmitting antennas and an array of receiving antennas, where the matrices take the form of:

$$W = W_{MI1}^{(1)} W_{MI2}^{(2)} \quad (1)$$

The first matrix $W_{MI1}^{(1)}$ in equation (1) is an inner precoder and it has a block diagonal structure of $$W_{MI1}^{(1)} = \begin{bmatrix} \tilde{W}_{MI1}^{(1)} & 0 \\ 0 & \tilde{W}_{MI1}^{(1)} \end{bmatrix} \quad (2)$$

For rank 1, the precoder could be formed as $$W = \begin{bmatrix} \tilde{W}_{MI1}^{(1)} & 0 \\ 0 & \tilde{W}_{MI1}^{(1)} \end{bmatrix} \begin{bmatrix} 1 \\ \alpha \end{bmatrix}, \alpha \in \{1, -1, j, -j\} \quad (3)$$

The rank 2 case would follow similarly as $$W = \begin{bmatrix} \tilde{W}_{MI1}^{(1)} & 0 \\ 0 & \tilde{W}_{MI1}^{(1)} \end{bmatrix} \begin{bmatrix} 1 & 1 \\ \alpha & -\alpha \end{bmatrix}, \alpha \in \{1, j\} \quad (4)$$

The second matrix in equation (1) represents a co-phasing factor that reflects short-term channel variations and can be made to adjust the structure of the overall precoder W to match either a single-polarized linear uniform array (ULA) or a cross-polarized array at the transmitting device.

The embodiments of the invention described herein may be used for various broadband wireless communication systems where a double codebook of precoding matrices is known by a transmitting device and a receiving device and the transmitting device is equipped with multiple antennas, some of which may have the same or different polarizations. And the codebook is used for sending feedback information from the receiving device to the transmitting device via a capacity-limited feedback channel. A double codebook is composed of two codebooks, which are sets of matrices, and the combination of one matrix from a first codebook C1 and one matrix from a second codebook C2 forms a precoder that can be used by the transmitting device to send data to a receiving device via multiple transmit antennas.

In an embodiment, a receiving device, which can be a UE, is connected to a transmitting device, which can be an access point, for a duration much longer than a transmission time interval. During this duration, the receiving device would send several feedback reports containing indices in a double codebook to recommend one or several precoders to the transmitting device.

In one embodiment, at least one message including a rank indication, a first codebook index n1 in a first codebook C1, and two codebook indices k1 and k2 in a second codebook C2, which is contained in at least one report, is fed back from the receiving device to the transmitting device. The indices (n1, k1) represent a wideband precoder W1 in the double codebook, while the indices (n1, k2) represent a subband precoder W2 in the double codebook, based on the same matrix with index n1 in the codebook C1. A wideband channel quality indicator (CQI1) is also reported in reference to the wideband precoder represented by (n1, k1), while a subband channel quality indicator (CQI2) is also reported in reference to the subband precoder represented by (n1, k2).

In some embodiments where the index k1 is not reported, it is assumed to be pre-defined with a common assumption known by both the receiving device and the transmitting device.

In an embodiment, a method for precoding feedback in a wireless communication system is disclosed. Referring to FIG. 1, the method includes:

S201: Obtaining, by a receiving device, a reference signal from a transmitting device;

S202: Deriving, by the receiving device, a rank indication, a first codebook index n1 in a first codebook C1, two codebook indices k1 and k2 in a second codebook C2, a wideband channel quality indicator CQI1 associated with a wideband precoding matrix represented by indices (n1, k1), and a subband channel quality indicator CQI2 associated with a wideband precoding matrix represented by indices (n1, k2) from the reference signal;

S203: sending, by the receiving device, a feedback report conveying the rank indication, the first codebook index n1, the two codebook indices k1 and k2, the wideband channel quality indicator CQI1, and the subband channel quality indicator CQI2, to the transmitting device; and S204: receiving, by the receiving device from the transmitting device, data precoded by a first precoder determined by the transmitting device based on the rank indication and the indices n1, k1 and k2.

In one instance, the first precoder is determined by the transmitting device based on the rank indication and the indices n1, k1 and k2.

The first precoder is determined based on the rank indication, a second precoder and a third precoder. The second precoder, which represents a wideband precoder, is determined by the indices n1 and k1. The third precoder, which represents a subband precoder, is determined by the indices n1 and k2.

Determining the second precoder based on the indices n1 and k1 includes:

The second precoder is determined as $W = W_{n_1}^{(1)} W_{k_1}^{(2)}$. $W_{n_1}^{(1)}$ represents the matrix determined by the index n1 in the codebook C1, and $W_{k_1}^{(2)}$ represents the matrix determined by the index k1 in the codebook C2.

Determining the third precoder based on the indices n1 and k2 includes:

The third precoder is determined as $W = W_{n_1}^{(1)} W_{k_2}^{(2)}$. $W_{n_1}^{(1)}$ represents the matrix determined by the index n1 in the codebook C1, and $W_{k_2}^{(2)}$ represents the matrix determined by the index k2 in the codebook C2.

Alternatively, determining the second precoder based on the indices n1 and k1 includes:

The second precoder is determined as $W = W_{k_1}^{(2)} W_{n_1}^{(1)}$. $W_{k_1}^{(2)}$ represents the matrix determined by the index k1 in the codebook C2, and $W_{n_1}^{(1)}$ represents the matrix determined by the index n1 in the codebook C1.

Determining the third precoder by the indices n1 and k2 at the includes:

The third precoder is determined as $W = W_{k_2}^{(2)} W_{n_1}^{(1)}$. $W_{k_2}^{(2)}$ represents the matrix determined by the index k2 in the codebook C2, and $W_{n_1}^{(1)}$ represents the matrix determined by the index n1 in the codebook C1.

The method above allows for reducing the number of reported indices for representing two precoders in a double codebook, and there is no performance impact.

Figure 2:
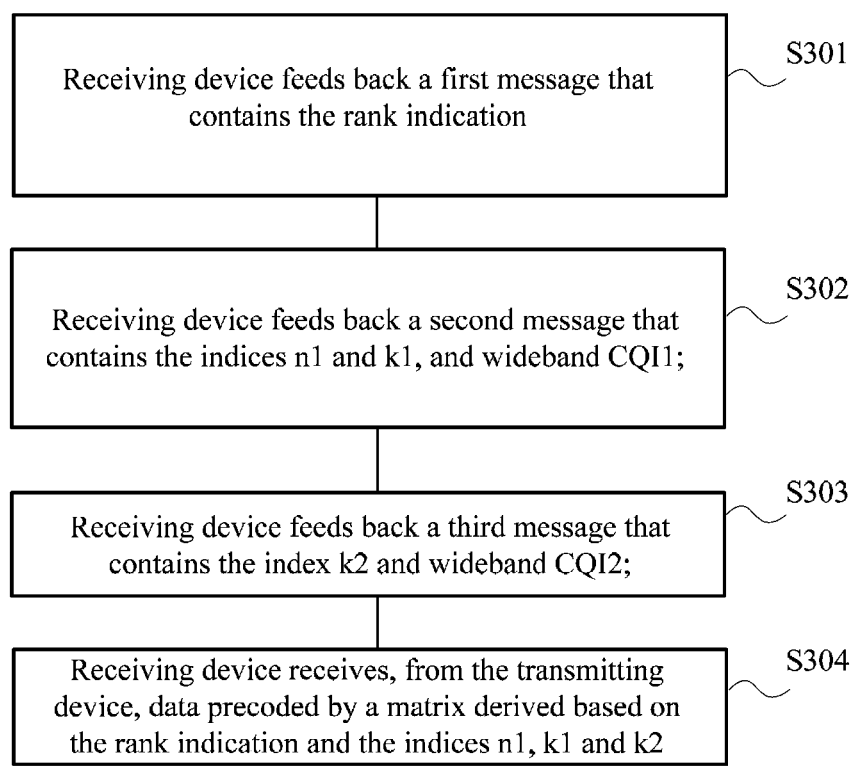
FIG. 2 is a flowchart of a method for precoding data according to another embodiment of the invention.

In one embodiment, the transmitting device may ask the receiving device to feed back in a series of messages as exemplified in FIG. 2.

S301: the receiving device sends a first message that contains the rank indication.

S302: the receiving device sends a second message that contains the indices n1 and k1 and the wideband channel quality indicator CQI1.

S303: the receiving device sends a third message that contains the index k2 and the subband channel quality indicator CQI2.

S304: the receiving device receives, from the transmitting device, data precoded by a matrix derived based on the rank indication and the indices n1, k1 and k2.

Figure 3:
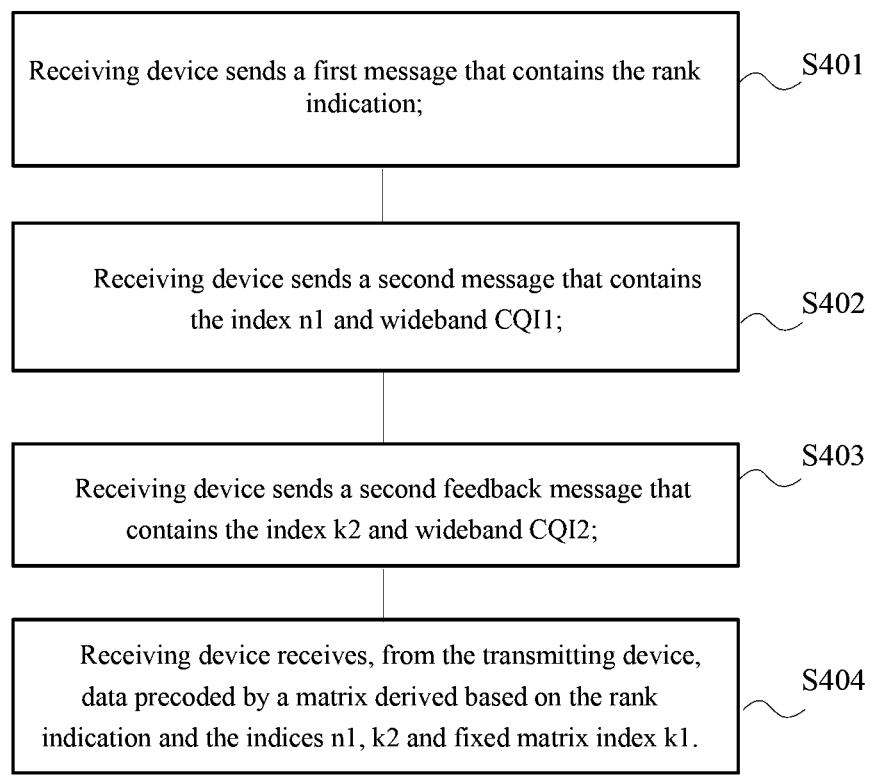
FIG. 3 is a flowchart of a method for precoding data according to yet another embodiment of the invention.

In one embodiment, the transmitting device may ask the receiving device to feed back in a series of compact messages that can contain one matrix index, as exemplified in FIG. 3.

S401: the receiving device sends a first message that contains the rank indication.

S402: the receiving device sends a second message that contains the index n1 and the wideband channel quality indicator CQI1.

S403: the receiving device sends a third message that contains the index k2 and the subband channel quality indicator CQI2. And the index k1 may be implicitly known by both the transmitting device and the receiving device as a fixed matrix index in the codebook C2.

S404: the receiving device receives, from the transmitting device, data precoded by a matrix derived based on the rank indication and the indices n1, k1 and k2.

In one embodiment, a precoding matrix in the double codebook is derived as $W = W^{(2)} W^{(1)}$, where $W^{(1)}$ is a matrix from the codebook C1, and $W^{(2)}$ is a matrix from the codebook C2. The wideband precoder $W_1$ is derived at the receiving device as $W_1 = W_{k_1}^{(2)} W_{n_1}^{(1)}$, and the subband precoder $W_2$ is derived as $W_2 = W_{k_2}^{(2)} W_{n_1}^{(1)}$. A wideband CQI, denoted as CQI1, represents the channel quality assuming the wideband precoding matrix is used at the transmitting device. A subband CQI, denoted as CQI2, represents the channel quality assuming the subband precoding matrix is used at the transmitting device.

In one embodiment, the index k1 is pre-defined at both the transmitting device and receiving device based on a fixed assumption, and the matrix which the index k1 represents may be the identity matrix, in which case the wideband precoder is simply represented as $W_{n_1}^{(1)}$.

In one embodiment, a precoding matrix in the double codebook is derived as $W = W^{(1)} W^{(2)}$, where $W^{(1)}$ is a matrix from the codebook C1, and $W^{(2)}$ is a matrix from the codebook C2. The wideband precoder $W_1$ is derived at the receiving device as $W_1=W_{n_1}^{(1)}W_{k_1}^{(2)}$, and the subband precoder $W_2$ is derived as $W_2=W_{n_1}^{(1)}W_{k_2}^{(2)}$. A wideband CQI, denoted as CQI1, represents the channel quality assuming the wideband precoding matrix is used at the transmitting device. A subband CQI, denoted as CQI2, represents the channel quality assuming the subband precoding matrix is used at the transmitting device. In one embodiment the index k1 is pre-defined at both the transmitting device and receiving device based on a fixed assumption, and the matrix which the index k1 represents may be the identity matrix or a block matrix composed of identity matrices of smaller dimension.

In one embodiment, a precoding matrix in the double codebook is derived as $W=W^{(1)}W^{(2)}$, where $W^{(1)}$ is a matrix from the codebook C1, and $W^{(2)}$ is a matrix from the codebook C2. The wideband precoder $W_1$ is derived at the receiving device as $W_1=W_{n_1}^{(1)}W_{k_1}^{(2)}$, and the subband precoder $W_2$ is derived as $W_2=W_{n_1}^{(1)}W_{k_2}^{(2)}$. A wideband CQI, denoted as CQI1, represents the channel quality assuming the wideband precoding matrix is used at the transmitting device. A subband CQI, denoted as CQI2, represents the channel quality assuming the subband precoding matrix is used at the transmitting device.

In one embodiment the index k1 is reported based on a subset of the codebook C2, and k1 may be reported with fewer bits than the index k2. For example, k2 is the index in the subset of the codebook C2.

In one embodiment, a precoding matrix in the double codebook is derived as $W=W^{(1)}W^{(2)}$, where $R=W^{(1)}$ is a normalized covariance matrix from the codebook C1, and $W^{(2)}$ is a matrix from the codebook C2. The wideband precoder $W_1$ is derived at the receiving device as $W_1=W_{n_1}^{(1)}W_{k_1}^{(2)}$, and the subband precoder $W_2$ is derived as $W_2=W_{n_1}^{(1)}W_{k_2}^{(2)}$. A wideband CQI, denoted as $CQI_1$, represents the channel quality assuming the wideband precoding matrix is used at the transmitting device. A subband CQI, denoted as $CQI_2$, represents the channel quality assuming the subband precoding matrix is used at the transmitting device.

In one embodiment, the index k1 is not reported but it is pre-defined at both the transmitting device and receiving device based on a common assumption, the matrix which the index k1 represents may be the principal eigenvector of the matrix R, or the best approximation of the principal eigenvector of the matrix R by a vector in the codebook C2.

Note that for persons skilled in the art, the embodiment above may be used for at least one subband.

The method above allows for reducing the number of reported indices and save the system resources, without adversely affecting performance.

It is understandable to those skilled in the art that all or part of the steps of the foregoing embodiments may be implemented by hardware instructed by a computer program. The program may be stored in a computer-readable storage medium. When being executed, the program performs all or part of the steps in foregoing method embodiments.

In another embodiment of the present invention, a receiving device that can realize all the above methods is also disclosed. In this embodiment, the receiving device may be a user equipment.

Figure 4:
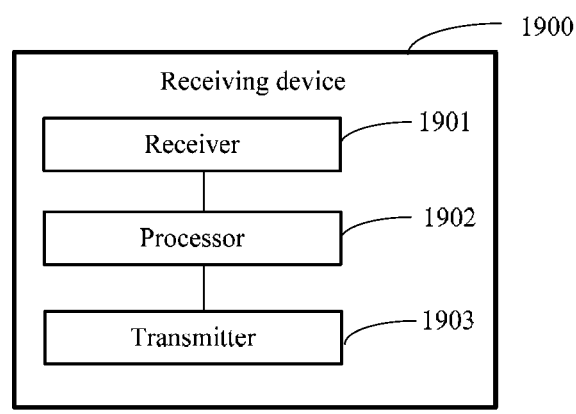
FIG. 4 is a simplified block diagram of a receiving device according to an embodiment of the invention.

Referring to FIG. 4, the receiving device 1900 includes:
a receiver 1901, configured to receive a reference signal from a transmitting device;
a processor 1902, configured to derive a rank indication, a codebook index n1 in a first codebook C1 and codebook indices k1 and k2 in a second codebook C2, a wideband channel quality indicator CQI1 and a subband channel quality indicator CQI2 based on the reference signal; and a transmitter 1903, configured to send the rank indication, the codebook index n1 in the first codebook C1, the codebook indices k1 and k2 in the second codebook C2, the wideband CQI1 and the subband CQI2 to the transmitting device.

In addition, the receiver 1901 is further configured to receive, from the transmitting device, data precoded by a first precoder which is determined by the transmitting device based on the rank indication and the indices n1, k1 and k2.

Note that for persons skilled in the art, the embodiment above may be used for at least one subband.

The embodiment above allows for reducing the number of reported indices and save the system resources, without performance reduction.

Figure 5:
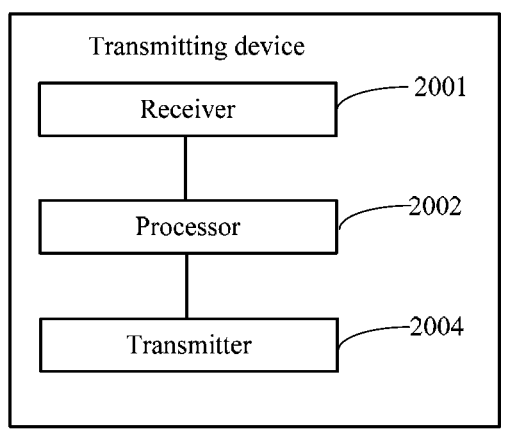
FIG. 5 is a simplified block diagram of a transmitting device according to an embodiment of the invention.

In another embodiment of the present invention, a transmitting device is described as in FIG. 5. In this embodiment, the transmitting device may be a base station.

The transmitting device includes the following:
a receiver 2001, configured to receive a rank indication, a codebook index n1 in a first codebook C1, codebook indices k1 and k2 in a second codebook C2, the wideband channel quality indicator CQI1 and the subband channel quality indicator CQI2 from a receiving device;
a processor 2002, configured to derive a first precoder based on the rank indication and the indices n1, k1 and k2, and
precode data to be sent to the receiving device using the first precoder; and
a transmitter 2004, configured to send the precoded data to the receiving device.

The first precoder comprises a second precoder and a third precoder, where the second precoder is a wideband precoder determined based on the indices n1 and k1, and the third precoder is a subband precoder determined based on the indices n1 and k2.

In one embodiment, the second precoder and the third precoder are determined by the following process.
The second precoder is determined by:
determining matrix $W_{n_1}^{(1)}$ using the index n1 in the codebook C1;
determining matrix $W_{k_1}^{(2)}$ using the index k1 in the codebook C2; and
determining the second precoder $W_1$ as $W_1=W_{n_1}^{(1)}W_{k_1}^{(2)}$.
The third precoder is determined by:
determining matrix $W_{n_1}^{(1)}$ using the index n1 in the codebook C1;
determining matrix $W_{k_2}^{(2)}$ using the index k2 in the codebook C2; and
determining the third precoder $W_2$ as $W_2=W_{n_1}^{(1)}W_{k_2}^{(2)}$.

In another embodiment, the second precoder and the third precoder are determined by the following process.
The second precoder is determined by:
determining matrix $W_{k_1}^{(2)}$ using the index k1 in the codebook C2;
determining matrix $W_{n_1}^{(1)}$ using the index n1 in the codebook C1; and
determining the second precoder $W_1$ as $W_1=W_{k_1}^{(2)}W_{n_1}^{(1)}$.
The third precoder is determined by:
determining matrix $W_{k_2}^{(2)}$ using the index k2 in the codebook C2;
determining matrix $W_{n_1}^{(1)}$ using the index n1 in the codebook C1; and
determining the third precoder $W_2$ as $W_2=W_{k_2}^{(2)}W_{n_1}^{(1)}$.
Note that for persons skilled in the art, the embodiment above may be used for at least one subband.

The embodiment above allows for reducing the number of reported indices and save the system resources, without adversely affecting performance.

Figure 6:
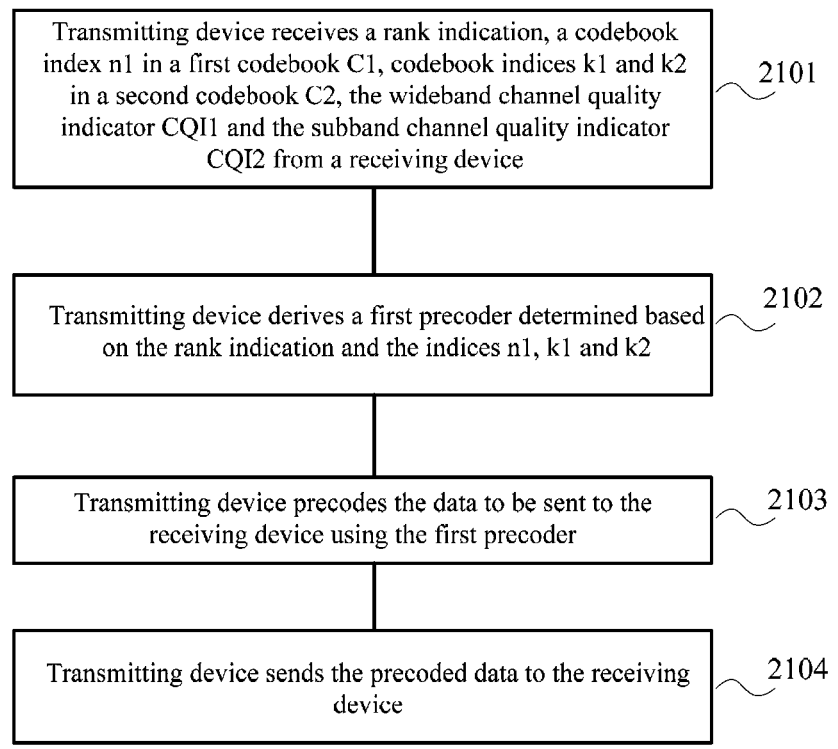
FIG. 6 is a flowchart of a method for precoding data according to an embodiment of the present invention.

In one embodiment, a method for precoding in a wireless communication system is detailed in FIG. 6. The method include:

S2101: a transmitting device receives a rank indication, a codebook index n1 in a first codebook C1, codebook indices k1 and k2 in a second codebook C2, the wideband channel quality indicator CQI1 and the subband channel quality indicator CQI2 from a receiving device, wherein the receiving device may be a user equipment;

S2102: the transmitting device derives a first precoder based on the rank indication and the indices n1, k1 and k2;

S2103: the transmitting device precodes data using the first precoder; and

S2104: the transmitting device sends the precoded data to the receiving device.

The transmitting device derives the first precoder determined based on the rank indication, a second precoder and a third precoder, in which the second precoder, which represents a wideband precoder, is determined by the indices n1 and k1, and the third precoder, which represents a subband precoder, is determined by the indices n1 and k2.

The second precoder $W_1$ is determined as $W_1 = W_{n_1}^{(1)} W_{k_1}^{(2)}$, in which the $W_{n_1}^{(1)}$ represents the matrix determined by the index n1 in the codebook C1, and the $W_{k_1}^{(2)}$ represents the matrix determined by the index k1 in the codebook C2; and the third precoder $W_2$ is determined as $W_2 = W_{n_1}^{(1)} W_{k_2}^{(2)}$, in which the $W_{n_1}^{(1)}$ represents the matrix determined by the index n1 in the codebook C1, and the $W_{k_2}^{(2)}$ represents the matrix determined by the index k2 in the codebook C2.

Alternatively, the second precoder $W_1$ is determined as $W_1 = W_{k_1}^{(2)} W_{n_1}^{(1)}$, in which the $W_{k_1}^{(2)}$ represents the matrix determined by the index k1 in the codebook C2, and the $W_{n_1}^{(1)}$ represents the matrix determined by the index n1 in the codebook C1; and the third precoder $W_2$ is determined as $W_2 = W_{k_2}^{(2)} W_{n_1}^{(1)}$, in which the $W_{k_2}^{(2)}$ represents the matrix determined by the index k2 in the codebook C2, and the $W_{n_1}^{(1)}$ represents the matrix determined by the index n1 in the codebook C1.

Note that for persons skilled in the art, the embodiment above may be used for at least one subband.

The embodiment above allows for reducing the number of reported indices and save the system resources, without adversely affecting performance.

Figure 7:
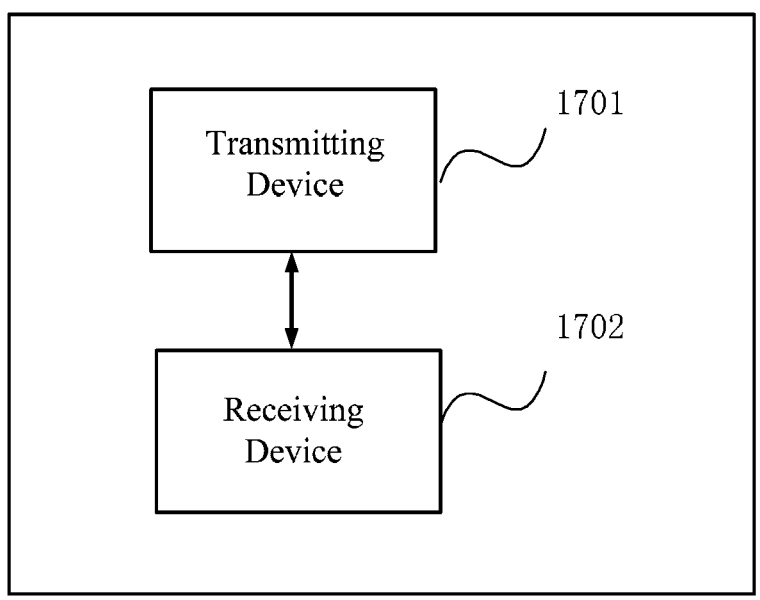
FIG. 7 is a simplified block diagram of a system according to an embodiment of the invention.

In one embodiment, a system for precoding is detailed in FIG. 7. The system 1700 includes a transmitting device 1701 and a receiving device 1702. The transmitting device 1701 may be a base station and the receiving device 1702 may be a user equipment.

The receiving device 1702 may include a receiver, configured to receive a reference signal from the transmitting device;

a processor, configured to derive a rank indication, a codebook index n1 in a first codebook C1 and codebook indices k1 and k2 in a second codebook C2, a wideband channel quality indicator CQI1 and a subband channel quality indicator CQI2, based on the reference signal;

a transmitter, configured to send the rank indication, the codebook index n1 in the first codebook C1, the codebook indices k1 and k2 in the second codebook C2, the wideband CQI1 and the subband CQI2 derived by the deriving unit, to the transmitting device; and the receiver is further configured to receive, from the transmitting device, data precoded by a first precoder which is determined by the transmitting device based on the rank indication and the indices n1, k1 and k2.

The transmitting device 1701 may include a receiver, configured to receive a rank indication, a codebook index n1 in a first codebook C1, codebook indices k1 and k2 in a second codebook C2, a wideband channel quality indicator CQI1 and a subband channel quality indicator CQI2 from the receiving device;

a processor, configured to derive a first precoder based on the rank indication and the indices n1, k1 and k2 and precode the data to be sent to the receiving device using the first precoder; and a transmitter, configured to send the precoded data to the receiving device.

The first precoder comprises a second precoder and a third precoder, where the second precoder is a wideband precoder determined based on the indices n1 and k1, and the third precoder is a subband precoder determined based on the indices n1 and k2.

In one embodiment, the second precoder and the third precoder are determined by the following process.

The second precoder is determined by:

determining matrix $W_{n_1}^{(1)}$ using the index n1 in the codebook C1;

determining matrix $W_{k_1}^{(2)}$ using the index k1 in the codebook C2; and determining the second precoder $W_1$ as $W_1 = W_{n_1}^{(1)} W_{k_1}^{(2)}$.

The third precoder is determined by:

determining matrix $W_{n_1}^{(1)}$ using the index n1 in the codebook C1;

determining matrix $W_{k_2}^{(2)}$ using the index k2 in the codebook C2; and determining the third precoder $W_2$ as $W_2 = W_{n_1}^{(1)} W_{k_2}^{(2)}$.

In another embodiment, the second precoder and the third precoder are determined by the following process.

The second precoder is determined by:

determining matrix $W_{k_1}^{(2)}$ using the index k1 in the codebook C2;

determining matrix $W_{n_1}^{(1)}$ using the index n1 in the codebook C1; and determining the second precoder $W_1$ as $W_1 = W_{k_1}^{(2)} W_{n_1}^{(1)}$.

The third precoder is determined by:

determining matrix $W_{k_2}^{(2)}$ using the index k2 in the codebook C2;

determining matrix $W_{n_1}^{(1)}$ using the index n1 in the codebook C1; and determining the third precoder $W_2$ as $W_2 = W_{k_2}^{(2)} W_{n_1}^{(1)}$.

Note that for persons skilled in the art, the embodiment above may be used for at least one subband.

The embodiment above allows for reducing the number of reported indices and save the system resources, without adversely affect performance.

It is envisioned that the method according to the above-mentioned embodiments may be realized by computer programs executable by the processors of the transmitting device and the receiving device. The transmitting device and the receiving device may each be equipped or coupled with a non-transitory storage medium for storing the programs. The storage medium may be a read-only memory (ROM), a magnetic disk or a compact disk (CD).

Although the invention is described through some exemplary embodiments, the invention is not limited to such embodiments. It is apparent that those skilled in the art can make modifications and variations to the invention without departing from the scope of the invention. The invention is intended to cover the modifications and variations provided that they fall in the scope of protection defined by the following claims or their equivalent.

What is claimed is:

1. A method for precoding data in a wireless communication system, comprising:
   receiving, by a receiving device, at least one reference signal from a transmitting device;
   deriving, by the receiving device, a rank indication, a first codebook index in a first codebook, and two second codebook indices in a second codebook, based on the at least one reference signal;
   sending, by the receiving device, the rank indication, the first codebook index in the first codebook, and the two second codebook indices in the second codebook, to the transmitting device; and
   receiving, by the receiving device, data precoded by a second precoder and a third precoder from the transmitting device,
   wherein the second precoder is determined based on the first codebook index and one of the two second codebook indices, and the third precoder is determined based on the first codebook index and the other one of the two second codebook indices.

2. The method according to claim 1, wherein the second precoder is a wideband precoder and the third precoder is a subband precoder.

3. The method according to claim 1, wherein the first codebook and the second codebook are configured in both the transmitting device and the receiving device.

4. The method according to claim 1, wherein sending the rank indication, the first codebook index in the first codebook, and the two second codebook indices in the second codebook to the transmitting device comprises:
   sending, by the receiving device, a first message that contains the rank indication;
   sending, by the receiving device, a second message that contains the first codebook index and one of the two second codebook indices; and
   sending, by the receiving device, a third message that contains the other one of the two second codebook indices.

5. A receiving device, comprising:
   a receiver, configured to receive at least one reference signal from a transmitting device;
   a processor, configured to derive a rank indication, a first codebook index in a first codebook, and two second codebook indices in a second codebook, based on the at least one reference signal; and
   a transmitter, configured to send the rank indication, the first codebook index in the first codebook, and the two second codebook indices in the second codebook, to the transmitting device;
   wherein the receiver is further configured to receive, from the transmitting device, data precoded by a second precoder and a third precoder, wherein the second precoder is determined based on the first codebook index and one of the two second codebook indices, and the third precoder is determined based on the first codebook index and the other one of the two second codebook indices.

6. The receiving device according to claim 5, wherein the receiving device is a user equipment in communication with a network entity in a wireless communication system.

7. The receiving device according to claim 6, wherein the user equipment is a mobile device, a cellular telephone, a wireless enabled personal digital assistant or a wireless enabled laptop computer, and the network entity is a base station, an evolved NodeB or an access point.

8. A method for precoding data in a wireless communication system, comprising:
   receiving, by a transmitting device, a rank indication, a first codebook index in a first codebook, and two second codebook indices in a second codebook, from a receiving device;
   determining, by the transmitting device, a second precoder and a third precoder, wherein the second precoder is determined based on the first codebook index and one of the two second codebook indices, and the third precoder is determined based on the first codebook index and the other one of the two second codebook indices;
   precoding, by the transmitting device, data to be sent to the receiving device by the second precoder and the third precoder; and
   sending, by the transmitting device, the precoded data to the receiving device.

9. The method according to claim 8, wherein the second precoder is a wideband precoder and the third precoder is a subband precoder.

10. The method according to claim 8, wherein determining the second precoder comprises:
    determining a matrix $W_{n_1}^{(1)}$ based on the first codebook index in the first codebook;
    determining a matrix $W_{k_1}^{(2)}$ based on one of the two second codebook indices in the second codebook; and
    determine the second precoder $W_1$ based on $W_1 = W_{n_1}^{(1)} W_{k_1}^{(2)}$ wherein n1 and k1 represent the first codebook index and the one of the two second codebook indices respectively;
    and wherein determining the third precoder comprises:
    determining a matrix $W_{n_1}^{(1)}$ based on the first codebook index in the first codebook;
    determining a matrix $W_{k_2}^{(2)}$ based on the other one of the two second codebook indices in the second codebook; and
    determining the third precoder $W_2$ based on $W_2 = W_{n_1}^{(1)} W_{k_1}^{(2)}$ wherein n1 and k2 represent the first codebook index and the other one of the two second codebook indices respectively.

11. The method according to claim 8, wherein determining the second precoder comprises:
    determining a matrix $W_{n_1}^{(1)}$ based on the first codebook index in the first codebook;
    determining a matrix $W_{k_1}^{(2)}$ based on the one of the two second codebook indices in the second codebook; and
    determine the second precoder $W_1$ based on $W_1 = W_{k_1}^{(2)} W_{n_1}^{(1)}$, wherein n1 and k1 represent the first codebook index and the one of the two second codebook indices, respectively;
    and wherein determining the third precoder comprises:
    determining a matrix $W_{n_1}^{(1)}$ based on the first codebook index in the first codebook;
    determining a matrix $W_{k_2}^{(2)}$ based on the other one of the two second codebook indices in the second codebook; and
    determining the third precoder $W_2$ based on $W_2 = W_{k_2}^{(2)} W_{n_1}^{(1)}$, wherein n1 and k2 represent the first codebook index and the other one of the two second codebook indices respectively.

12. The method according to claim 8, wherein the first codebook and the second codebook are configured in both the transmitting device and the receiving device.

13. A transmitting device, comprising:
a receiver, configured to receive a rank indication, a first codebook index in a first codebook, and two second codebook indices in a second codebook, from a receiving device;
a processor, configured to determine a second precoder and a third precoder based on the rank indication and the first codebook index and the two second codebook indices, and precode data to be sent to the receiving device by the second precoder and the third precoder; and
a transmitter, configured to send the precoded data to the receiving device;
wherein the second precoder is determined based on the first codebook index and one of the two second codebook indices, and the third precoder is determined based on the first codebook index and the other one of the two second codebook indices.

14. The transmitting device according to claim 13, wherein the second precoder is a wideband precoder and the third precoder is a subband precoder.

15. The transmitting device according to claim 13, wherein the transmitting device is a network entity in communication with a user equipment in a wireless communication system.

16. The transmitting device according to claim 15, wherein the user equipment is a mobile device, a cellular telephone, a wireless enabled personal digital assistant or a wireless enabled laptop computer, and the network entity is a base station, an evolved NodeB or an access point.

* * * * *